Aug. 7, 1934.　　　　　E. J. SIMANEK　　　　　1,969,159
BRAKE MECHANISM
Filed July 27, 1932　　　　2 Sheets-Sheet 2
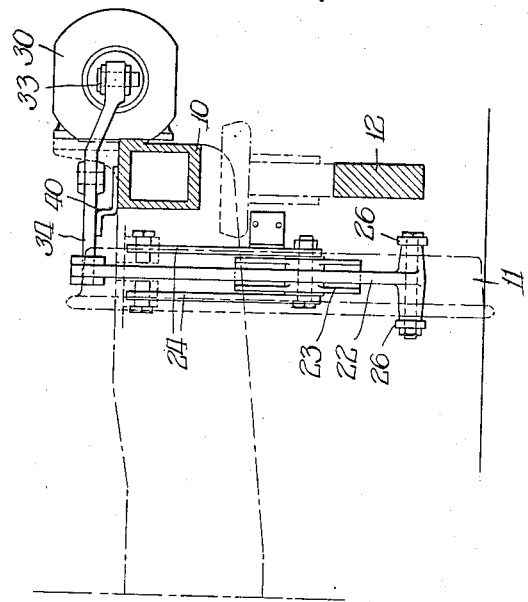
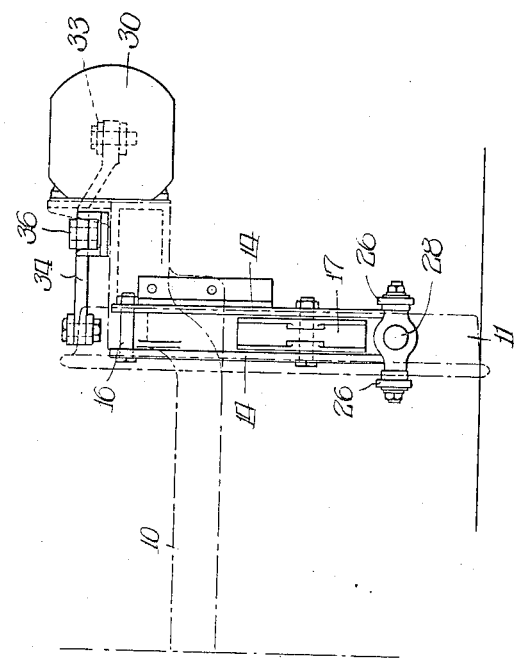
Inventor:
Edward J. Simanek,
By Wilkinson, Huxley, Byron & Knight
attys Patented Aug. 7, 1934

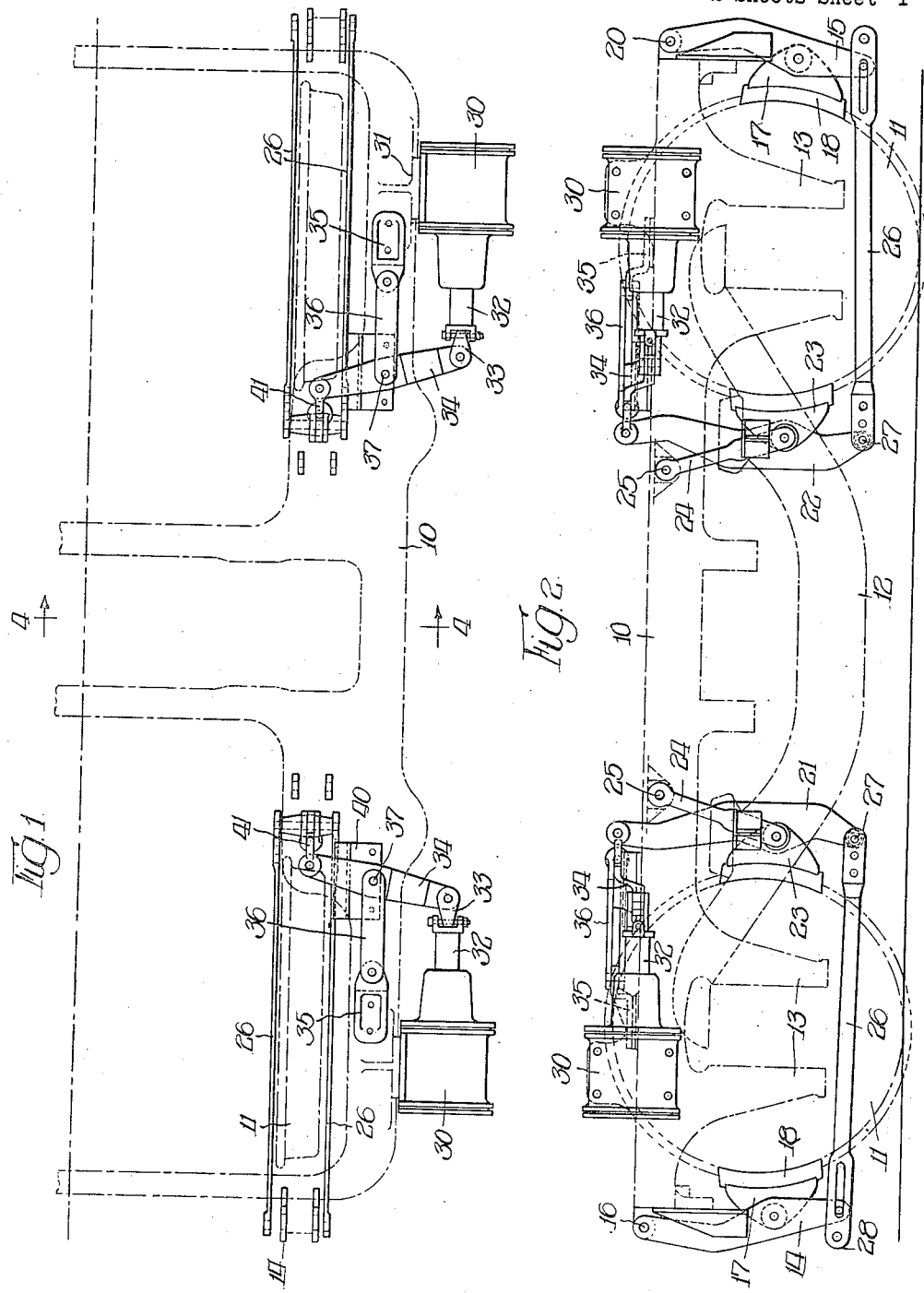

1,969,159

UNITED STATES PATENT OFFICE 1,969,159

BRAKE MECHANISM

Edward J. Simanek, Chicago, Ill., assignor to American Steel Foundries, Chicago, Ill., a corporation of New Jersey Application July 27, 1932, Serial No. 624,960

4 Claims. (Cl. 188—56)

The invention relates to brake mechanism or brake rigging for use on railway car trucks and has particular reference to a unit cylinder arrangement for brake rigging of the clasp type.

An object of the invention is to provide brake rigging for four-wheel motor trucks wherein each wheel will have associated therewith a pressure cylinder connected through suitable linkage to brake heads disposed on both sides of the wheel. Accordingly the brake structure contemplates a unit brake cylinder arrangement for each wheel of the truck.

A further object is to provide improved brake mechanism in which the brake cylinders are mounted on the truck frame in a manner to meet all clearance conditions and service requirements.

With these and various other objects in view, the invention may consist of certain novel features of construction and operation, as will be more fully described and particularly pointed out in the specification, drawings and claims appended hereto.

In the drawings which illustrate an embodiment of the device and wherein like reference characters are used to designate like parts—

Figure 1 is a fragmentary top plan view of a railway car truck equipped with the brake arrangement of the present invention;

Figure 2 is a view in side elevation of the car truck shown in Figure 1;

Figure 3 is a fragmentary view in end elevation of the left portion of the truck of Figure 1; and Figure 4 is a vertical cross sectional view taken substantially on the plane indicated by line 4—4 of Figure 1.

The brake mechanism of the present invention is disclosed in connection with a railway car truck comprising a truck frame 10 supported from the journal ends of wheel and axle assemblies having wheels indicated diagrammatically at 11 through equalizers 12. The equalizers are supported upon journal boxes, not shown, which are mounted for movement within the depending pedestals 13 provided on the frame 10. Inasmuch as the brake rigging is of a similar construction on both sides of the truck frame the following description will refer to only one side.

Located to the outside of the wheels 11 are dead truck levers 14 and 15, a pair of the levers 14 being pivoted in spaced relation to the truck frame 10 as at 16 and having connection intermediate their ends with brake heads 17 provided with brake shoes 18 adapted to have braking cooperation with the treads of the adjacent wheels. In a similar manner the outside dead truck levers 15, pivoted to the frame at 20, have connection to brake heads 17. To the inside of the car wheels are located the live truck levers 21 and 22, respectively, each having connection intermediate their ends with brake heads 23 and each being supported from the truck frame by a pair of brake hangers 24 positioned on opposite sides of the truck lever and having pivotal connection with the frame at 25.

The set of live and dead truck levers for each wheel are operatively connected by tie or pull rods 26 positioned on opposite sides of the car wheels 11 and having pivotal connection to the lower end of the live lever as at 27. The pair of dead levers at their lower ends have adjustable connection with the tie rod by means of the slack adjuster 28 which serves to take up the slack in the brake rigging caused by brake shoe and wheel wear. Since the present invention contemplates a unit brake arrangement for each wheel a slack adjuster is provided at the connection of each pair of dead truck levers with their tie rods 26.

The operating means for the brake rigging described includes a plurality of brake cylinders 30 suitably secured to the frame at 31 in the vicinity of each of the car wheels. The push rod 32 of each cylinder has pivotal connection through clevis 33 with the outer end of a horizontal or equalizer lever or dead cylinder lever 34. A bracket 35 is secured to the frame adjacent to the pressure cylinder and pivotally mounts a link 36 for connection with the equalizer lever at substantially its mid-point as at 37. A bracket 40 secured to the frame forms a support for the inner end of the equalizer levers, which levers have connection through clevis 41 with the upper end of the live truck levers 21 and 22, respectively.

Each car wheel is accordingly provided with a unit brake arrangement including connecting live and dead truck levers, with the former having operative connection to a pressure cylinder mounted on the frame. Actuation of the cylinder in each instance will cause rotation of the cylinder lever in a manner to apply the brake shoes carried by the inside of the brake heads 23 to the wheel and as the dead truck levers are operatively connected to the tie rods 26 the outside brake shoes will likewise be applied to the wheels.

The application of power to the brake shoes take place through a minimum of linkage since a single equalizer lever is interposed between the live truck lever and the push rod of the cylinder.

The brakes are applied to the wheels with uniform pressure as the air pressure admitted to each cylinder is the same throughout the car.

It is to be understood that I do not wish to be limited by the exact embodiment of the device shown which is merely by way of illustration and not limitation, as various and other forms of the device will of course be apparent to those skilled in the art without departing from the spirit of the invention or the scope of the claims.

I claim:

1. In a brake arrangement, the combination of a truck frame, spaced wheels disposed inwardly of said frame and in supporting relation to said truck frame, journal means between said truck frame and wheels, independent brake mechanism for each wheel, each mechanism including a dead and live truck lever disposed at opposite sides of the wheel and provided with brake shoes adapted to have braking cooperation with the associated wheel, a connection between said levers, a dead cylinder lever pivotally and movably mounted on said truck frame for movement in a horizontal plane, said cylinder lever being mounted above said truck frame, a pivotal connection connecting said cylinder lever and said live truck lever, and an operating cylinder mounted on said truck frame adjacent the top thereof and above the journal means and disposed in substantially horizontal alignment with the adjacent wheel, the piston of said cylinder being pivotally connected to said cylinder lever for operation of its associated brake mechanism.

2. In a brake arrangement, the combination of a truck frame, spaced wheels disposed inwardly of said frame and in supporting relation to said truck frame, journal means between said truck frame and wheels, independent brake mechanism for each wheel, each mechanism including a dead and live truck lever disposed at opposite sides of the wheel and provided with brake shoes adapted to have braking cooperation with the associated wheel, a connection between said levers, a dead cylinder lever pivotally and movably mounted intermediate the ends thereof on said truck frame for movement in a horizontal plane, said cylinder lever being mounted above said truck frame, a pivotal connection connecting the inner end of said cylinder lever and said live truck lever, and an operating cylinder mounted on said truck frame adjacent the top thereof and above the journal means and disposed in substantially horizontal alignment with the adjacent wheel, the piston of said cylinder being pivotally connected to the outer end of said cylinder lever for operation of its associated brake mechanism.

3. In a brake arrangement, the combination of a truck frame, a wheel disposed in supporting relation thereto, journal means between said truck frame and wheel, brake mechanism for said wheel, said mechanism including a dead and live truck lever disposed at opposite sides of said wheel and provided with brake shoes adapted to have braking cooperation with said wheel, a connection between said levers, a dead cylinder lever pivotally and movably mounted intermediate the ends thereof on said truck frame for movement in a horizontal plane, said cylinder lever being mounted above said truck frame, a pivotal connection connecting the inner end of said cylinder lever and said live truck lever, and an operating cylinder mounted on said truck frame adjacent the top thereof and above the journal means and disposed in substantially horizontal alignment with said wheel, the piston of said cylinder being pivotally connected to the outer end of said cylinder lever for operation of said brake mechanism.

4. In a brake arrangement, the combination of a truck frame, a wheel disposed in supporting relation thereto, journal means between said truck frame and wheel, brake mechanism for said wheel, said mechanism including a dead and live truck lever disposed at opposite sides of said wheel and provided with brake shoes adapted to have braking cooperation with said wheel, a connection between said levers, a dead cylinder lever pivotally and movably mounted on said truck frame for movement in a horizontal plane, a pivotal connection connecting said cylinder lever and said live truck lever, and an operating cylinder mounted on said truck frame adjacent the top thereof and above the journal means and disposed in substantially horizontal alignment with said wheel, the piston of said cylinder being pivotally connected to said cylinder lever for operation of said brake mechanism.

EDWARD J. SIMANEK.